Aug. 7, 1973       W. STURMER ET AL       3,751,334
METHOD OF AND APPARATUS FOR CONTROLLING A NUCLEAR REACTOR
Filed July 7, 1971
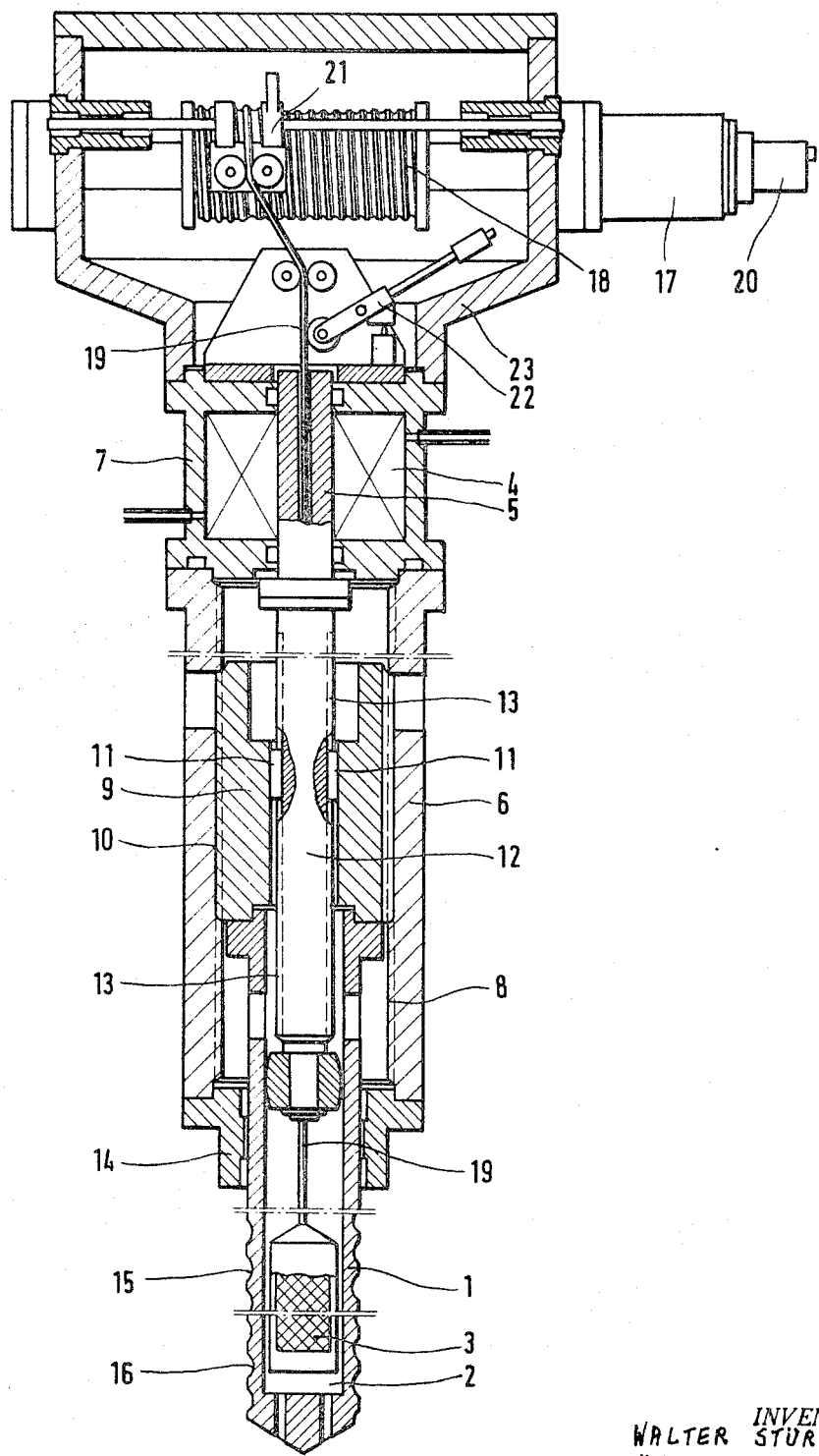
INVENTORS
WALTER STURMER
HUBERT HANDEL
BY Torren & MacGeddy
attorneys United States Patent Office 3,751,334
Patented Aug. 7, 1973

3,751,334
METHOD OF AND APPARATUS FOR CONTROLLING A NUCLEAR REACTOR
Walter Sturmer, Mannheim, and Hubert Handel, Burstadt, Germany, assignors to Brown Boveri/Krupp Reaktorbau GmbH, Cologne, Germany
Filed July 7, 1971, Ser. No. 160,468
Claims priority, application Germany, Apr. 23, 1971, P 21 19 895.8
Int. Cl. G21c 7/12
U.S. Cl. 176—36 R
10 Claims

ABSTRACT OF THE DISCLOSURE

For the control and shut-down of the fission reaction in a pebble bed nuclear reactor where ball-shaped operating elements including fuel elements are arranged in a pile, a tubular casing is arranged to be rotated as it moves axially through the pile, and an absorber element is positioned within the casing. A cable is attached to the absorber element and to a winch or similar device for selectively positioning the absorber element within the casing. The exterior surface of the casing is shaped so that it passes through the pile without causing undue stress in the ball-shaped elements.

SUMMARY OF THE INVENTION

The present invention is directed to the control of pebble bed nuclear reactors and, more particularly, it concerns a control arrangement which is movable into a pile of ball-shaped operating elements including fuel elements in a reactor, for controlling or shutting-down the fission reaction.

In the operation of pebble bed nuclear reactors it has been known to use control and/or shut-down rods which, depending on their position, control the fission reaction or completely shut it down. In nuclear reactors where the operating elements including the fuel elements are arranged as a pile of ball-shaped members, the control or shut-down rods are inserted directly into the pile of ball-shaped members or elements. If it is necessary to vary the output of the reactor, the rods have to be moved inwardly or outwardly relative to the pile of the ball-shaped elements. Such movements of the rods cause wear on the operating elements, and under certain circumstances, an operating element may be damaged and such damage may result in the release of injurious fission products into the primary coolant circuit. In reactors with the fuel elements arranged as ball-shaped members, a gas, preferably helium, is used as the heat transfer medium in the primary coolant circuit. As the operating elements in such nuclear reactors, fuel elements, graphite balls without fuel material, and absorber elements can be used.

Therefore, it is the primary object of the present invention to avoid the drawbacks previously experienced in nuclear reactors where the ball-shaped operating elements are arranged in a pile, and to assure that undesired stresses and resulting wear do not occur in the operating elements due to the control operation.

Accordingly, the control and/or shut-down rods used in accordance with the present invention serve not only for regulating the output of the reactor but also for equalizing localized neutron flux changes. To effect the necessary control or regulating operation where the fission reaction takes place within a pile of ball-shaped operating elements, a tubular casing with an absorber element positioned within it, is moved into the pile of ball-shaped elements to a predetermined position based on the required output range and the absorber element is axially displaceable within the casing to provide the desired control of the fission reaction. Instead of the absorber rods used in the past, in the present arrangement the control is effected by an absorber element movable within a casing which does not usually require any displacement once it is positioned within the pile of ball-shaped elements. As a result, in the control operation the stress previously experienced by the ball-shaped elements is reduced to a minimum. It is only during the inital movement of the casings into the pile of ball-shaped elements that any stress takes place. By effecting such movement very slowly, this stress can be adjusted in such a manner that the least amount of damage takes place in the operating elements. Once the casing is in place, the absorber element can be moved through the casing to effect control of the fission reaction without affecting the operating elements since there is no physical contact between the absorber element and the operating elements. Therefore, by means of the invention, the casings can be moved into the pile of ball-shaped operating elements in the reactor until the desired output rate of the fission reaction is achieved and, thereafter, the control of the fission reaction can be accomplished by means of the freely movable absorber element located in the interior of the casing. When this control arrangement is no longer effective, it can be readily removed and replaced.

In addition to its use for controlling the fission reaction in a reactor, the tubular casing and the absorbing element can also be used to effect a complete shut-down of the reactor. The shut-down is accomplished by moving the absorber elements to a greater depth into the reactor. In view of the lateral forces which may develop under certain circumstances about the control rods, it is advantageous to arrange such rods or casings so that they reach or almost reach the bottom of the reactor in the region of the discharge opening loacted at its base. In larger reactors it is desirable to locate the control rod casings at the discharge openings, particularly if the casing is formed of a material having the required low neutron absorption cross section and one which cannot be subjected to high mechanical stresses.

As indicated above, the action of moving the control rod casings in and out of the pile of ball-shaped elements is accomplished at a relatively slow rate. In a reactor of medium size, the time required for inserting the control rod casing into the pile may take about one week or more. In particular if the reactor is arranged for the circulation of the fuel elements, the insertion action of the control rod casings is facilitated by after-trickling or seeping of the fuel elements during the circulating procedure. During the circulating procedure, the operating elements are discharged from the lower portion of their reactor and are again added through sorting and conveying devices to the upper portion.

In carrying out the method of the present invention, control or shut-down rods are used and the rods are formed of a tubular casing movable in its axial direction and containing an absorber element which is also movable in the axial direction relative to the casing. Advantageously, the casing is formed from a material having a low neutron absorption cross section, preferably graphite. With the control rod casings positioned substantially vertically, the absorber elements are secured at the ends of a flexible member, preferably a cable which can be secured to a winch arrangement for moving it upwardly and downwardly within the casing. The winch arrangement includes a control device in contact with the cable extending into the tubular casing and assures that the cable remains tensioned and that the absorber element does not contact the bottom of the casing. Moreover, it is preferable if the exterior wall of the casing is provided with a single or multiple thread. In effecting the axial movement of the tubular casing, it is coupled with a driving arrangement which imparts to it a rotary movement in addition to the axial movement. The combined rotary and axial movement considerably facilitates the insertion of the tubular casings into the pile of ball-shaped elements.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing:

The drawing is a vertical sectional view of an apparatus embodying the present invention.

DETAILED DESCRIPTION OF THE INVENTION

In the drawing an axially extending tubular casing 1 is shown containing an absorber element 3 within the inner space 2 in the casing and both the casing 1 and the absorber element 3 are associated with apparatus for moving them in the axial direction. The apparatus for moving the casing 1 provides it with both axial and rotational movement. The apparatus for moving the casing consists essentially of an electric drive device 4 including a shaft 5 and a casing 7 laterally enclosing the device 4. Secured to the lower end of the housing 7 is an axially extending cylindrically shaped sleeve-like member 6 which has a thread 8 extending for the length of its interior surface. Within the interior of the sleeve-like member 6 another axially extending sleeve-like member 9 is arranged which has a length less than that of the member 6. A thread 10 is formed on the outer surface of the sleeve-like member 9 and it is in meshed engagement with the thread 8 on the interior of the other sleeve-like member 6. In addition, gliding pieces 11 are formed in and extend inwardly from the inner surface of the sleeve-like member 9. Extending through the opening within the sleeve-like member 9 is a shaft 12 which is rigidly connected at its upper end to the lower end of the shaft 5 associated with the electric drive device 4. Grooves 13 are formed in the exterior surface of the shaft 12 and the gliding pieces 11 extend into these grooves.

At its upper end, the tubular casing 1 is secured to the lower end of the sleeve-like member 9 within the other sleeve-like member 6. At the lower end of the sleeve-like member 6, an annular guide member 14 is provided which contacts the exterior surface of the tubular casing 1 and also provides a closure for the lower end of the space within the sleeve-like member 6 for limiting the movement of the casing 1. The tubular casing 1 is formed of graphite and its outer surface 15 is provided with a thread 16.

In effecting the movement of the tubular casing 1, the electric drive device 4 transmits a left-hand or right-hand rotation through its shaft 5 to the shaft 12 extending downwardly through the sleeve-like member 9 into the upper end of the casing 1. The gliding pieces 11 provide an interengagement between the shaft 12 and the sleeve-like member 9. Further, since the sleeve-like member 9 is in meshed engagement through its thread 10 with the thread 8 on the inner surface of the other sleeve-like member 6, based on the direction of the rotational movement, the sleeve-like member 9 moves either upwardly or downwardly within the interior of sleeve-like member 6. Since the sleeve-like member 9 is rigidly connected with the tubular casing 1, the casing follows the same axial and rotational movement of the member 9. The rotational movement of the casing and the thread 16 formed in its exterior surface facilitate its penetration into the pile of ball-shaped elements.

For positioning the absorber element 3 within the space in the tubular casing 1, a winch-like arrangement is provided consisting of an electric motor 17, a drum 18, and a cable secured to the drum. From the drum, the cable 19 extends downwardly through aligned bores in the shafts 5 and 12 and is connected at its lower end to the absorber element 3. By rotating the drum 18 the absorber element can be moved in the axial direction of the casing 1 into the desired position. Located on the electric motor 17 is a setting indicator 20 which displays the position of the absorber element 3 within its casing 1. To effect uniform winding of the cable 19 on the drum 18, a guide device 21 is associated with the drum and the cable. Below the drum and above the electric drive device 4, a control member 22 is positioned in contact with the cable 19 which monitors the tension on the cable. A casing 23 is mounted on the upper end of the casing 7 for the electric drive device 4 and provides a housing for the drum 18 and supports the electric motor 17.

While a specific embodiment of the invention has been shown and described in detail to illustrate the application of the inventive principles, it will be understood that the invention may be embodied otherwise without departing from such principles.

What is claimed is:

1. A method of controlling a nuclear reactor in which the operating elements including the fuel elements are ball-shaped and are arranged in a pile, comprising the steps of supporting an absorber element within an axially extending casing, said casing being substantially closed at its lower end and being formed of a non-neutron absorbing material, moving the casing in its axial direction directly into the pile into a predetermined position therein with displacement of some of the operating elements thereof, and moving the absorber element in the axial direction within the casing for controlling the nuclear reaction.

2. A method, as set forth in claim 1, characterized therein by rotating the casing about its axis as it is being moved in the axial direction for facilitating its movement within the pile.

3. A method, as set forth in claim 2, characterized therein by inserting the casing into the pile of operating elements at a selected speed for maintaining the stress on the operating elements within acceptable limits.

4. Apparatus for controlling and shutting-down the fission reaction in a reactor and in combination therewith in which ball-shaped operating elements including ball-shaped fuel elements are arranged in a pile, comprising an axially elongated tubular casing, said casing being substantially closed at its lower end and being formed of a non-neutron absorbing material, means for moving said casing in the axial direction directly into said pile with displacement of some of the operating elements thereof, an absorber element located within said casing, and means for axially displacing said absorber element relative to said casing for controlling said reactor.

5. Apparatus, as set forth in claim 4, characterized in that said casing being formed of graphite.

6. Apparatus, as set forth in claim 4, characterized in that said means for axially displacing said absorber element comprises a rotatable drum, a flexible cable secured to said drum at one end and to said absorber element at its other end.

7. Apparatus, as set forth in claim 4, characterized in that a control device associated with said drum for selectively locating said absorber element within said casing relative to the pile of operating elements.

8. Apparatus, as set forth in claim 6, characterized in that means being arranged in contact with said cable for monitoring the tension on said cable.

9. Apparatus, as set forth in claim 4, characterized in that the exterior surface of said casing being threaded and said means for moving said casing in the axial direction including means for rotating said casing about its axis as it is moved in the axial direction.

10. Apparatus, as set forth in claim 4, characterized in that said means for moving said casing comprises an electric drive device including a housing and a shaft arranged to be driven by said electric drive device, a second shaft attached to said first shaft and extending axially from it into said casing, a first sleeve member secured to said electric drive device housing and laterally enclosing said second shaft, said first sleeve member being threaded on its interior surface, a second sleeve member positioned within and having a length less than that of said first sleeve member, the exterior surface of said second sleeve being threaded and arranged in meshed engagement with the threaded surface of said first sleeve member, said casing being secured to said second sleeve member, said second shaft having grooves in its exterior surface which extend in the axial direction of said second shaft, gliding pieces secured to the interior surface of said second sleeve member and extending inwardly into the grooves in said second shaft, said first shaft and said second shaft each having an axially extending bore therethrough, and said means for axially displacing said absorber element comprising a cable secured at one end to said absorber element and extending axially through the bores in said first and second shafts, and means for securing the other end of said cable and for displacing said cable for positioning said absorber element in the axial direction within and relative to said casing.

References Cited

UNITED STATES PATENTS

| | | | |
|---|---|---|---|
| 3,519,536 | 7/1970 | Rausch | 176—36 |
| 3,365,368 | 1/1968 | Fray | 176—36 R |

FOREIGN PATENTS

| | | | |
|---|---|---|---|
| 1,204,938 | 9/1970 | Great Britain | 176—86 R |

CARL D. QUARFORTH, Primary Examiner

H. E. BEHREND, Assistant Examiner

U.S. Cl. X.R.

176—86 R